(12) United States Patent
Xiao et al.

(10) Patent No.: US 8,326,834 B2
(45) Date of Patent: Dec. 4, 2012

(54) DENSITY-BASED CO-LOCATION PATTERN DISCOVERY

(75) Inventors: Xiangye Xiao, Beijing (CN); Xing Xie, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 695 days.

(21) Appl. No.: 12/145,695

(22) Filed: Jun. 25, 2008

(65) Prior Publication Data

US 2009/0327342 A1 Dec. 31, 2009

(51) Int. Cl.
*G06F 17/30* (2006.01)
(52) U.S. Cl. ........................................ 707/736
(58) Field of Classification Search .............. 707/736, 707/758
See application file for complete search history.

(56) References Cited

U.S. PATENT DOCUMENTS

| | | | |
|---|---|---|---|
| 5,724,573 A | 3/1998 | Agrawal et al. | |
| 5,832,182 A | 11/1998 | Zhang et al. | |
| 5,930,474 A | 7/1999 | Dunworth et al. | |
| 6,003,029 A | 12/1999 | Agrawal et al. | |
| 6,496,814 B1 | 12/2002 | Busche | |
| 6,882,997 B1 * | 4/2005 | Zhang et al. | 707/737 |
| 7,010,564 B2 | 3/2006 | Morimoto et al. | |
| 7,177,864 B2 * | 2/2007 | Ekhaus | 707/776 |
| 2002/0002552 A1 | 1/2002 | Schultz et al. | |
| 2003/0212658 A1 * | 11/2003 | Ekhaus | 707/1 |
| 2004/0260604 A1 | 12/2004 | Bedingfield | |
| 2006/0106778 A1 | 5/2006 | Baldwin | |
| 2007/0055662 A1 * | 3/2007 | Edelman et al. | 707/6 |
| 2008/0228783 A1 * | 9/2008 | Moffat | 707/100 |

FOREIGN PATENT DOCUMENTS

WO  WO2007142507 A1  12/2007

OTHER PUBLICATIONS

Shekhar, Shashi, et al., "Discovering Spatial Co-location Patterns: A Summary of Results", SSTD 2001, LNCS 2121, Springer-Verlag, Berlin, Germany, © 2001, pp. 236-256.*
Estivill-Castro, Vladimir, et al., "Clustering with Obstacles for Geographical Data Mining", ISPRS Journal of Photogrammetry & Remote Sensing, vol. 59, Issues 1-2, Aug. 2004, pp. 21-34.*
Morimoto, Yasuhiko, "Geometrical Information Fusion from WWW and Its Related Information", DNIS 2007, LNCS 4777, Springer-Verlag, Berlin, Germany, © 2007, pp. 16-32.*
Tan, Pang-Ning, et al., "Finding Spatio-Temporal Patterns in Earth Science Data", KDD 2001 Workshop on Temporal Data Mining, San Francisco, CA, Aug. 26, 2001, pp. 1-12.*
Martins, Bruno, et al., "Handling Locations in Search Engine Queries", GIR '06, Seattle, WA, Aug. 10, 2006, pp. 1-6.*

(Continued)

*Primary Examiner* — Thu-Nguyet Le
(74) *Attorney, Agent, or Firm* — L. Alan Collins; Collins & Collins Intellectual, LLC

(57) ABSTRACT

Described is using density to efficiently mine co-location patterns, such as closely located businesses frequently found together in business listing databases, geographic search logs, and/or GPS-based data. A data space of such information is geographically partitioned into a grid of cells, with dense cells scanned first. A dynamic upper bound of prevalence measure of co-location patterns is maintained during the scanning process. If the current upper bound is smaller than a threshold, the scanning is stopped, thereby significantly reducing the computation cost for processing many cells, while providing suitable results.

20 Claims, 7 Drawing Sheets

OTHER PUBLICATIONS

Yoo, Jin Soung, et al., "A Partial Join Approach for Mining Co-location Patterns", GIS '04, Washington, DC, Nov. 12-13, 2004, pp. 241-249.*

Schikuta, Erich, et al., "BANG-Clustering: A Novel Grid-Clustering Algorithm for Huge Data Sets", Advances in Pattern Recognition, Joint IAPR Workshops SSPR '98 and SPR '98, Sydney, Australia, LNCS, Springer-Verlag, Aug. 11-13, 1998, pp. 867-874.*

Yoo, Jin Soung, et al., "A Joinless Approach for Mining Spatial Colocation Patterns", IEEE Transactions on Knowledge and Data Engineering, vol. 18, No. 10, IEEE Computer Society, Oct. 2006, pp. 1323-1337.*

Sheikholeslami, Gholamhosein, et al., "WaveCluster: A Multi-Resolution Clustering Approach for Very Large Spatial Databases", Proc. of the 24th VLDB, New York, NY, © 1998, pp. 428-439.*

Kolatch, Erica, "Clustering Algorithms for Spatial Databases: A Survey", CiteSeer, © 2001, pp. 1-22.*

Shekhar, et al., "Trends in Spatial Data Mining", Department of Computer Science and Engineering, University of Minnesota, pp. 24, 2008.

Xiong, et al., "A Framework for Discovering Co-location Patterns in Data Sets with Extended Spatial Objects", retrieved at <<http://www-users.cs.umn.edu/~kumar/papers/extensible.pdf>>, pp. 12, 2008.

Verhein, et al., "Mining Spatio-Temporal Association Rules, Sources, Sinks, Stationary Regions and Thoroughfares in Object Mobility Databases", Oct. 2005, pp. 23.

Xiong, et al., "Hyperclique Pattern Discovery", 2005 Kluwer Academic, pp. 1-30.

Agrawal, et al., "Mining Association Rules between Sets of Items in Large Databases", Proceedings of the 1993 ACM SIGMOD international conference on Management of data, 1993, ACM, pp. 207-216.

Estivill-Castro, et al., "Data Mining Techniques for autonomous exploration of large volume of geo-referenced crime data", retrieved at <<http://www.it.jcu.edu.au/Subjects/cp5090/2005-1/resources/phillips-5090.pdf, pp. 12, 2008.

Estivill-Castro, et al., "Discovering Associations in Spatial Data—An Efficient Medoid Based Approach", Proceedings of the Second Pacific-Asia Conference on Research and Development in Knowledge Discovery and Data Mining, 1998, pp. 110-121.

Han, et al., "Geominer: A system prototype for spatial data mining", ACM SIGMOD International Conference on Management of Data, 1997, pp. 4.

Huang et al., "Discovering Catial Pata Sets: A General Approach", IEEE Transactions on Knowledge and Data Engineering, vol. 16, No. 12, Dec. 2004, pp. 1472-1485.

Huang, et al., "On the Relationships Between Clustering and Spatial Co-location Pattern Mining", Proceedings of the 18th IEEE International Conference on Tools with Artificial Intelligence, 2006, IEEE, pp. 8.

Knorr, et al., "Finding Aggregate Proximity Relationships and Commonalities in Spatial Data Mining", IEEE Transactions on Knowledge and Data Engineering, vol. 8, No. 6, Dec. 1996, pp. 884-897.

Koperski, et al., "Discovery of Spatial Association Rules in Geographic Information Databases", Proceedings of the 4th International Symposium on Advances in Spatial Databases, 1995, pp. 20.

Morimoto, "Mining frequent neighboring class sets in spatial databases", Proceedings of the seventh ACM SIGKDD international conference on Knowledge discovery and data mining, 2001, ACM, pp. 353-358.

"A Joinless Approach for Mining Spatial Colocation Patterns", IEEE Transactions on Knowledge and Data Engineering, Vol. 18, No. 10, Oct. 2006, pp. 1323-1337.

Yoo, et al., "A Partial Join Approach for Mining Co-location Patterns", Proceedings of the 12th Annual ACM International Workshop on Geographic Information Systems, 2004, ACM, pp. 241-249.

* cited by examiner

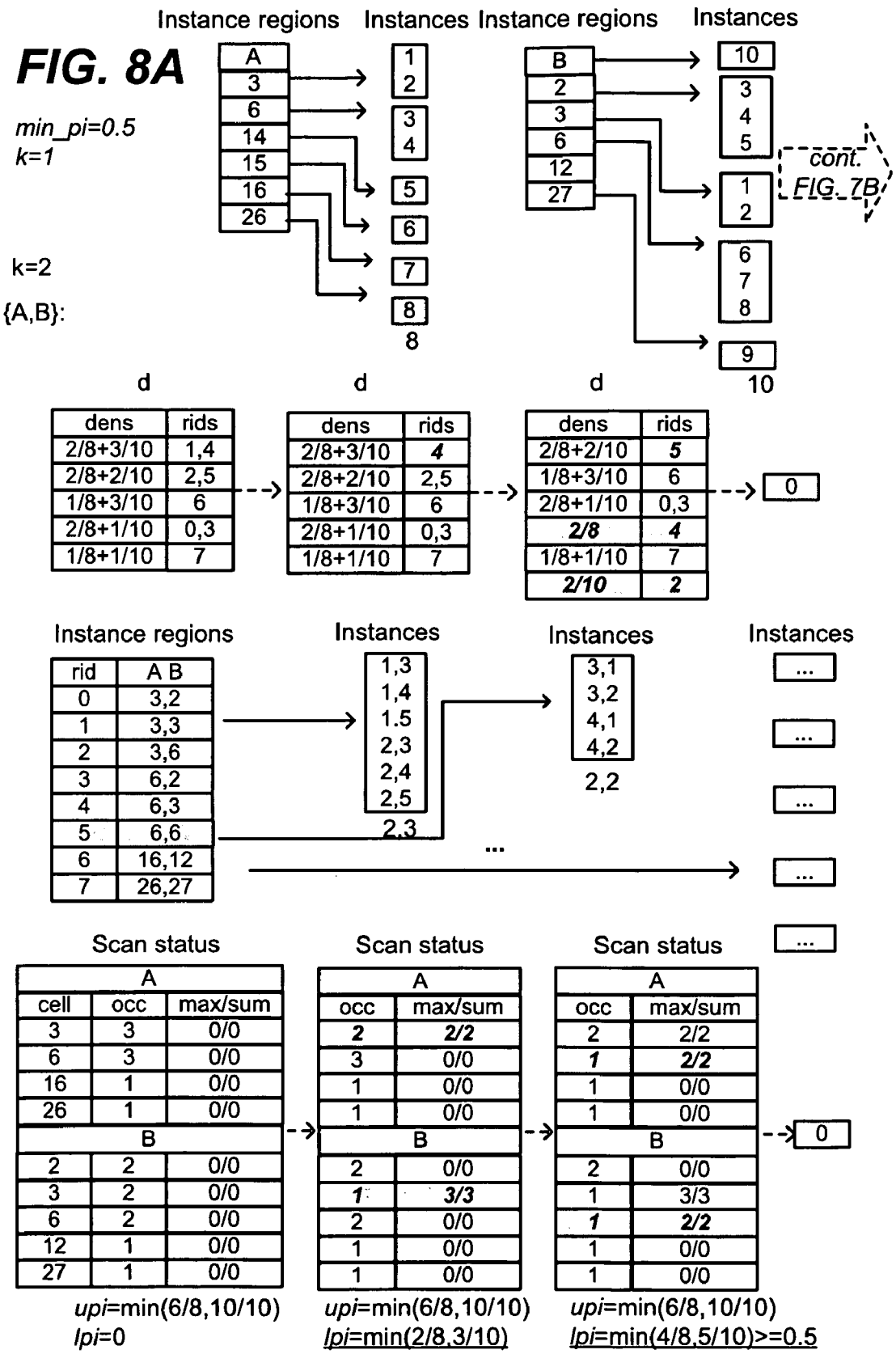

DENSITY-BASED CO-LOCATION PATTERN DISCOVERY

BACKGROUND

With the development of location-based services and the popularity of various mobile devices such as cellular phones, PDAs, and GPS-enabled devices, large amounts of data with spatial contexts have become available. Examples of such data with spatial contexts include geographic search logs comprising keywords with associated locations, and GPS logs that maintain latitude, longitude, and velocity information.

Co-location pattern discovery is directed towards processing data with spatial contexts to find classes of spatial instances that are frequently located together. Examples of such spatial instances include businesses listed in yellow page-like databases and queries on geographical search engines. For example, a co-located query pattern may be {"shopping mall", "parking"}, because people often search for the terms "shopping mall" and "parking" over locations that are geographically close to one another.

Discovering spatial co-location patterns has useful applications; for instance, co-located queries discovered from search logs can help with query suggestion, location recommendation, and targeted local advertising. However, previous co-location pattern mining techniques are not scalable for a large data set, such as geographic search logs and GPS logs. One reason is that a large number of expensive join operations are required to generate co-location instances, primarily due to the way in which a co-location instance set is scanned, typically in its entirety.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which co-location patterns are determined from processing a set (data space) of spatial data, including by partitioning the a data space into a grid of cells, and processing the most dense cells first to generate instances. In the event that the number of already generated co-location instances plus an upper bound estimation of an instance number in the non-processed cells (unchecked space) is smaller than a prevalence threshold, instance generation stops in the remaining areas. As a result, the number of joins to generate co-location instances may be significantly reduced.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIGS. 8A and 8B comprise an example representation showing processing via the dense space first mining algorithm on the data set of FIG. 7.

DETAILED DESCRIPTION

Various aspects of the technology described herein are generally directed towards co-location pattern discovery via a dense space first co-location pattern mining mechanism (e.g., algorithm) that reduces the number of join operations relative to previous algorithms. In general, rather than generating all instances of candidate co-location patterns, dense areas are first checked in a data space that is likely to have more positive instances, before less dense areas. When the number of already-generated co-location instances, plus an upper bound estimation of an instance number in the unchecked space, is less than a prevalence threshold, the algorithm stops generating instances in the remaining areas. As a result, the number of joins used to generate co-location instances is greatly reduced.

It is understood that the examples used herein, such as for describing suitable algorithms, are non-limiting examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and search technology in general.

Figure 1:
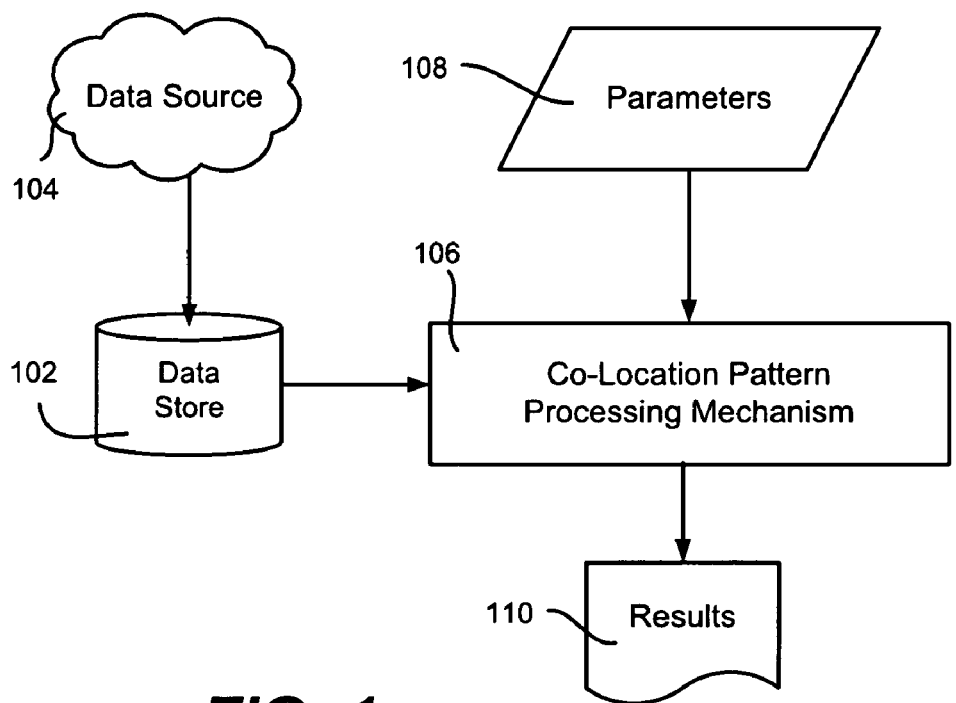
FIG. 1 is a block diagram representing example components related to processing data to obtain co-location patterns.

Turning to FIG. 1, there is shown a generalized block diagram exemplifying the processing of a data store 102 comprising data with spatial contexts built from one or more sources of input data 104, such as a database (e.g., such as a listing of business), a geographic search log gathered from past queries, and/or GPS-based data. As generally represented in FIG. 1, a co-location pattern processing mechanism 106, optionally controlled by parameters 108, (such as one or more user-provided thresholds, co-location pattern sizes and so forth) to provide a set of results 110. Examples of a dense space first mining algorithm suitable for use with the co-location pattern processing mechanism 106 are described below.

Figure 2:
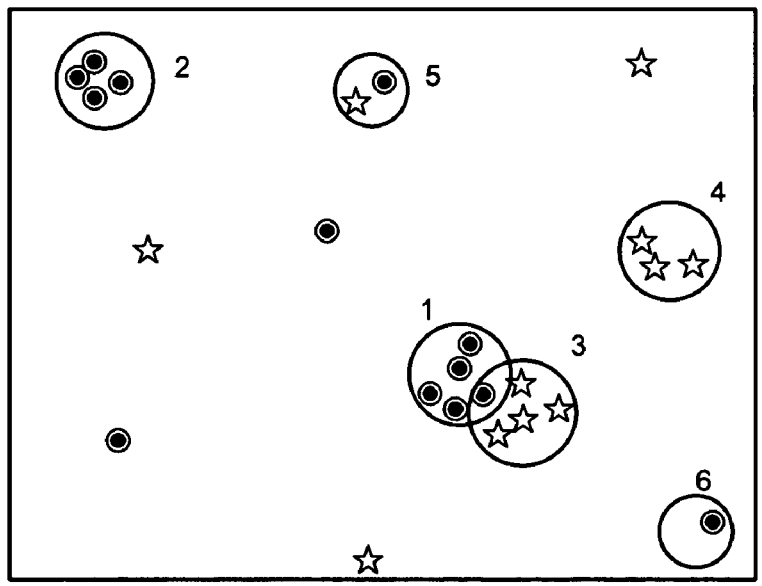
FIG. 2 is a representation of spatial instances, including instances that may correspond to co-located query patterns.

FIG. 2 illustrates various aspects of one example algorithm, using 0.5 as a threshold (a prevalence threshold) for determining whether {A,B} comprises a co-location pattern, that is, whether at least half of the instances of A (shaded circles) and B (stars) are neighbors to each other, within a certain distance. In FIG. 2, classes A and B have thirteen and twelve instances, respectively, whereby at least seven of A's instances and six of B's instances need to be neighboring in order to identify {A,B} as a co-located pattern according to that 0.5 prevalence threshold. The large circles indicate an area on the data space.

As can be seen from FIG. 2 in general, instances of both A and B are densely located in circled areas labeled one (1) and three (3). Therefore, it is likely that neighboring instances of A and B may be found there. However, circled areas two (2) and four (4) may be skipped when looking for neighboring instances, as only instances of one class are located in each area. Consider that in areas one (1) and three (3), two in five instances of A are found neighboring to instances of B. Excluding the four instances of A that are found in area two (2), four instances of A are in unchecked areas. Thus, at most six instances of A can be neighbors to instances of B after checking areas one (1) and three (3) and skipping area four (4). Because this value of six is already smaller than the prevalence threshold, {A,B} cannot be a co-location pattern; it is not necessary to check the remaining areas.

As can be readily appreciated, in this manner, the number of joins is reduced. One example algorithm is designed based on the assumption of non-uniform distributions of instances in geographic space (e.g., a map). The assumption can be validated using real data; for example, different categories of businesses tend to locate frequently in different places, e.g., restaurants and commercial buildings often locate in downtown areas, while gas stations can be found along most main roads, providing relatively very different and non-uniform distributions. Based on the different distributions of classes in geographic space, co-location instances may be checked in the most promising areas first, and sparse areas checked later, if needed.

In one example implementation, a spatial instance of a class is defined to have three fields, namely an instance identifier (id), a location, and a class id. Given a set of classes T, a set of their instances I, and a neighbor relation R over I, a co-location cl is a subset of classes, cl ⊆ T. Further, a neighbor relation R is given to determine close geographic proximity of instances; two instances $i_1$ and $i_2$ are a pair of neighbors if $R(i_1, i_2)$. For example, when Euclidean distance with a distance threshold $\epsilon$ is used to determine a neighbor relation R, two spatial instances are neighbors if their Euclidean distance is at most $\epsilon$. For a set of instances $\{i_1, \ldots, i_k\}$, if $R(i_i, i_j)$, $\forall i, j \in \{1, \ldots, k\}$, $\{i_1, \ldots, i_k\}$ is a neighbor-set, denoted as $R(i_1, \ldots, i_k)$. Then, an instance of a size k co-location cl=$\{t_1, \ldots, t_k\}$ is a set of k instances $\{i_1, \ldots, i_k\}$, where $i_m$ is an instance of class $t_m$, and $\{i_1, \ldots, i_k\}$ is a neighbor-set, that is, $R(i_1, \ldots, i_k)$. Note that by size k, {A} is size one, {A,B} is size two, {A,B,C} is size three, and so on.

Figure 3:
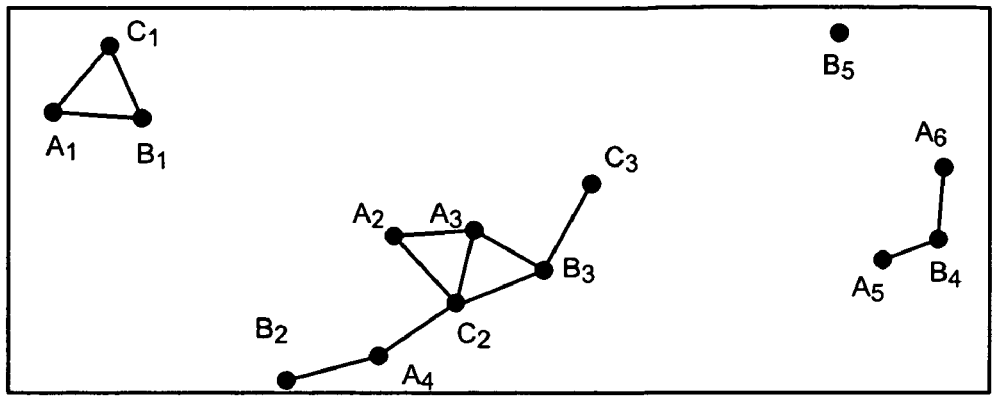
FIG. 3 is a representation of a dataset mapped to exemplify showing location relationships between spatial instances.

By way of example, in FIG. 3, $\{A_3, B_3, C_2\}$ is an instance of co-location {A,B,C} because $A_3$ is an instance of A; $B_3$ is an instance of B; $C_2$ is an instance of C; and $R(A_3, B_3, C_2)$. To measure the prevalence of a co-location, participation ratio $pr(cl, t_i)$ of a class $t_i$ in a co-location cl=$\{t_1, \ldots, t_k\}$ is defined as the fraction of instances of class $t_i$ in the instances of co-location cl. Then, the participation index pi(cl) of a co-location cl=$\{t_1, \ldots, t_k\}$ is defined as the minimum participation ratio among classes in co-location cl. Equations 1 and 2 give a definition of pr and pi:

$$pr(cl, t_i) = \frac{n_i}{N_i}, \quad (1)$$

$$pi(cl) = \min_{i=1}^{k} pr(cl, t_i), \quad (2)$$

where $n_i$ denotes the number of distinct instances of class $t_i$ in the instances of cl, and $N_i$ denotes the overall number of instances of class $t_i$ in the original data set I. A co-location is then defined as a co-location pattern if its participation index is not less than a given threshold.

For example, in FIG. 3, the instances of co-location cl={A, B} are $\{A_1, B_1\}$, $\{A_3, B_3\}$, $\{A_4, B_2\}$, $\{A_5, B_4\}$, and $\{A_6, B_4\}$. The participation ratio of class A in cl pr(cl,A) is 5/6 because $A_1, A_3, A_4, A_5$, and $A_6$ (totaling five) among six instances of A are involved in the co-location instances. Similarly, pr(cl, B) is 4/5. Thus, the participation index of co-location cl, pi(cl), is min{pr(cl,A), pr(cl,B)}=4/5. When the participation index threshold is set at 0.5, co-location {A,B} is a co-location pattern.

Similarly, the instances of {A,B,C} are $\{A_1, B_1, C_1\}$, and $\{A_3, B_3, C_2\}$. Thus, pi(cl'={A,B,C})=min{pr(cl',A), pr(cl',B), pr(cl',C)}=min{2/6, 2/5, 2/3}=2/6<0.5, whereby the co-location {A,B,C} is not a co-location pattern.

Based on these definitions, the co-location pattern discovery problem is formally defined as follows. Given a) a set of classes T, b) a set of spatial instances I, in which each instance i ∈ I has a location, a class type t, t ∈ T, and an instance id, c) a spatial neighbor relation R, which is a distance metric-based neighbor relation and has a symmetric property, and d) a participation index threshold min_pi, the co-location pattern discovery problem is directed towards finding a correct and complete set of co-location patterns, each of which has a participation index greater than min_pi.

Figure 4:
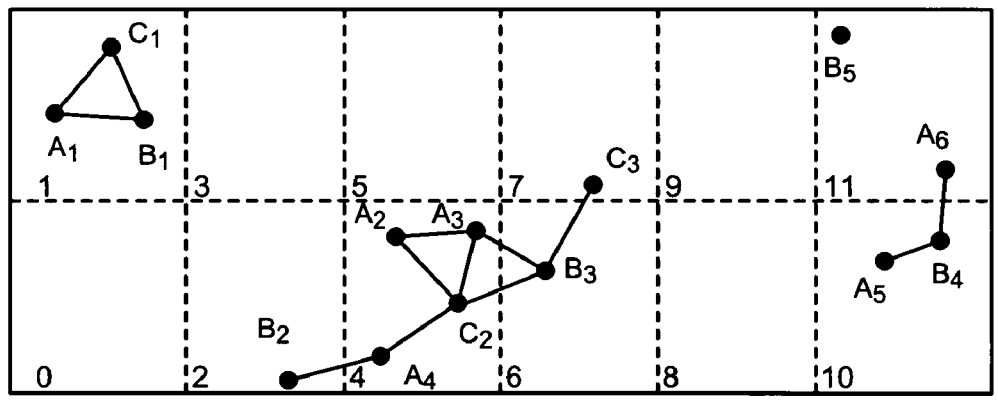
FIG. 4 is a representation of a dataset mapped to exemplify showing location relationships between spatial instances, in which the data set is partitioned into grids.

As represented in FIG. 4 which divides the data set in FIG. 3 into a grid, consider that the relevant geographic space is divided into equally-sized rectangle cells, with the number at the left bottom corner of each cell representing that cell's id. Two cells are neighboring cells if they share a common side or a common vertex. A cell is also considered a neighboring region of itself. Thus, in FIG. 4, cells 4 and 5 are two neighboring cells; cells 4 and 6 are also neighboring cells.

Further, a set of cells $\{c_1, \ldots, c_k\}$ is a neighbor-cell-set if $\forall i,j \in \{1, \ldots, k\}$, $c_i$ and $c_j$ are neighboring cells. Then, an instance-cell-set of a co-location cl=$\{t_1, \ldots, t_k\}$ is defined as a set of k cells r=$\{c_1, \ldots, c_k\}$ such that $\forall i \in \{1, \ldots, k\}$, there exist instances of $t_i$ in cell $c_i$, and that $\{c_1, \ldots, c_k\}$ is a neighbor-cell-set. For example, in FIG. 4, {4, 6, 7} is an instance-cell-set of co-location {A,B,C} because $A_2, A_3$, and $A_4$ are in cell 4, $B_3$ is in cell 6, and $C_3$ is in cell 7, and because cells 4, 6, and 7 form a neighbor-cell-set.

Note that cells in an instance-cell-set of a co-location can be repeated because a cell is a neighboring cell of itself. For example, in FIG. 4, {4, 6, 4} is also an instance-cell-set of co-location {A,B,C}.

Through instance-cell-sets, the instance set of a co-location is partitioned into disjoint instance subsets. Each instance subset contains the instances of a co-location in an instance-cell-set. When Euclidean distance is used for deciding neighbor relation and the cell width is larger than the distance threshold, instance-cell-sets of a co-location have the property that each instance of a co-location is located in one and only one instance-cell-set.

The "Density" of an instance-cell-set of a co-location cl is a scalar score used to measure contribution of an instance-cell-set to the participation index of cl. Two density measurements may be used, including naïve density and weighted density. The naïve density nd(r) of an instance-cell-set r=$\{c_1, \ldots, c_k\}$ of a co-location cl=$\{t_1, \ldots, t_k\}$ is the sum of instance numbers of all classes of cl in r divided by the sum of the overall instance number of the classes in cl. It can be written as:

$$nd(r) = \frac{\sum_{i=1}^{k} N_{ir}}{\sum_{i=1}^{k} N_i}, \qquad (3)$$

where $N_{ir}$ is the instance number of class $t_i$ in r, and $N_i$ is the overall instance number of class $t_i$ in the input instance set I. For example, in FIG. 4, $A_2, A_3, A_4$, among six instances of A, is in cell 4; B3 among five instances of B, is in cell 6. As a result, the naïve density of instance-cell-set {4,6} of co-location {A,B} is (3+1)/(6+5)=4/11.

The weighted density wd(r) of an instance-cell-set $r=\{c_1, \ldots, c_k\}$ of a co-location $cl=\{t_1, \ldots, t_k\}$ is the sum of the quotients of dividing the instance number of each class ci in cl by the entire instance number of ci. The weighted density can be written as:

$$wd(r) = \frac{1}{k} \sum_{i=1}^{k} \frac{N_{ir}}{N_i}. \qquad (4)$$

A instance-cell-set that contains instances of rare classes (classes with a small amount of instances) is generally more important than an instance-cell-set with the same number of instances of common classes (classes with a large amount of instances). For example, if class a has ten instances and class b has one-hundred instances, instance-cell-set $r_1$ has four instances of a and one instance of b, and instance-cell-set $r_2$ has one instance of a and four instances of b, and min_pi=0.5; then, $nd(r_1)=nd(r_2)=5/110$, $wd(r_1)=(4/10+1/100)/2>wd(r_2)=(1/10+4/100)/2$ via Equations 3 and 4. As can be seen, according to naïve density, $r_1$ is as good as $r_2$. However, according to weighted density, $r_1$ is better than $r_2$; the latter is expected to be more reasonable because $r_1$ contributes eighty percent of the min requirement on instance number of a (5) and two percent of the min requirement on instance number of b (50), which is 0.82 in total. In comparison, the contribution of $r_2$ is only 0.28.

Because in this example $$\sum_{i=1}^{k},$$

$N_i$ and k are the same for the instance-cell-sets. Equation 5 may be used to to calculate naïve density and weighted densities of instance-cell-sets:

$$nd(r) = \sum_{i=1}^{k} N_{ir}, \; wd(r) = \sum_{i=1}^{k} \frac{N_{ir}}{N_i} \qquad (5)$$

Turning to dense space first mining, as described herein, given a set of classes T, an instance set I, a neighbor relation R, and a participation index threshold min_pi, a dense space first co-location mining algorithm (the mechanism 106 of FIG. 1) outputs co-location patterns. The following table describes variables used in the example algorithm:

| | |
|---|---|
| G | a grid of the set of instances I |
| k | candidate co-location size in current iteration, i.e., number of classes in a co-location |
| $P_k$ | a set of size k co-location patterns |
| $C_k$ | a set of size k candidate co-location patterns |
| $R_k$ | a set of instance-cell-sets of $C_k$. $R_k$[cl] denotes a set of instance-cell-sets of candidate cl |
| $RI_k$ | a set of instances of Ck. $RI_k$[cl] denotes a set of instances of candidate cl |
| lpr/upr | lower/upper bound estimations of pr of classes in a candidate |
| lpi/upi | lower/upper bound estimation of pi of a candidate |
| d | sorted densities of instance-cell-sets of candidate cl. d[r] denotes the density of instance-cell-set r of cl |
| status | scan status of classes in candidate cl. status[$t_i$][c] denotes scan status of class $t_i$, $t_i \in$ cl, in the instance-cell-sets with a common ith cell c |

Figure 5:
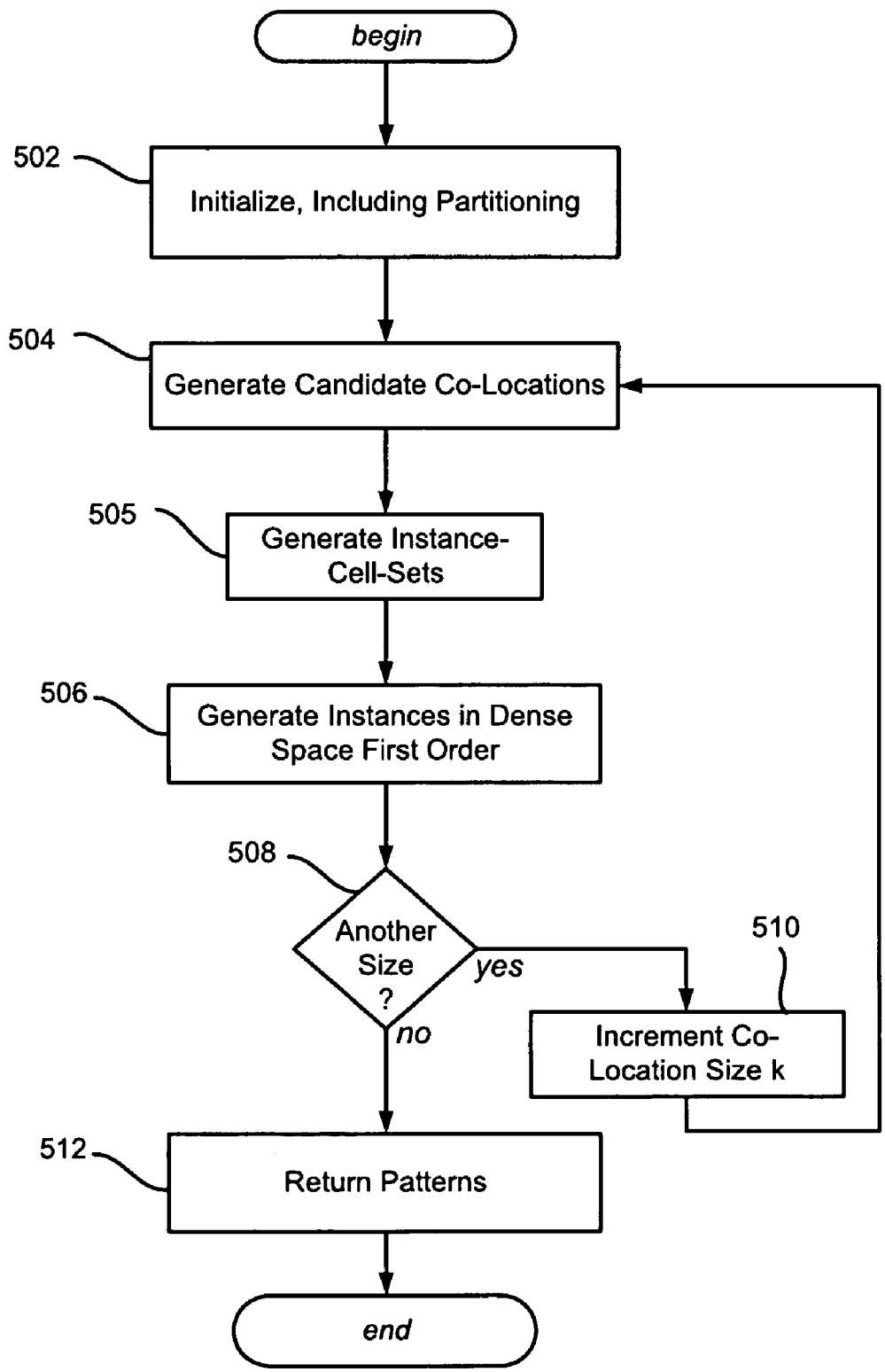
FIG. 5 is a flow diagram representing example steps that may be taken by a dense space first co-location pattern mining algorithm.

The following is an example of one suitable dense space first co-location pattern mining algorithm, which is also represented in the flow diagram of FIG. 5:

```
Input:
    T, I, R, min_pi
Output:
    A complete and correct set of prevalent co-location
    patterns with prevalence values ≧ min_pi
Variables:
    G, k, P_k, C_k, R_k, RI_k
Method:
1: G=load instances into grid(T,I,R);
2: generate instance-cell-sets and instances for size 1 co-
   locations(G,R1,RI1);
3: P1 = T, k = 2;
4: while (P_{k-1} ≠ Φ) do
5:      C_k=generate candidate co-locations(P_{k-1});
6:      R_k=generate instance-cell-sets(Ck, R_{k-1});
7:      for all (cl ∈ Ck) do
8:             generate_instances_in_dense_space_first_order
                   (cl,min_pi,P_k,R_{k-1},R_k,RI_{k-1},RI_k);
9:      k = k + 1;
10: return ∪(P_2,...,P_k);
```

As shown in the above algorithm, initialization takes place as represented by steps 1-3 and step 502 of FIG. 5. For example, one initialization step (step 1 in the textual algorithm above) divides the input instance set I into partitions using a grid G according to the locations of instances. The grid G guarantees that if two instances are neighbors, they are located in neighboring cells, i.e., the cell width is larger than $\epsilon$.

Another initialization step generates instance-cell-sets $R_1$ and co-location instances in $RI_1$ for size 1 co-locations (step 2). Because the input classes in T are viewed as size 1 co-location patterns P1, the instance-cell-sets of a size 1 co-location are actually the cells in which instances of a class locate. Thus, the second step simply scans each cell in the grid G one time to identify cells and instances in cells for the classes. For example, in FIG. 4, instance-cell-sets of {A} include cell 1 containing instances $A_1$, cell 4 containing instances $A_2$, $A_3$, and $A_4$, cell 10 containing $A_5$, and cell 11 containing $A_6$. After $R_1$ and $RI_1$ are generated, size 1 co-location patterns $P_1$ are set to T and the co-location size k is set to 2 (step 3).

After the initialization steps, the algorithm comprises three main steps, (steps 5, 6, 8 in the textual algorithm above, corresponding to steps 504-506 in FIG. 5). One step (text step 5/step 504 in FIG. 5) generates size k candidate co-locations $C_k$ using the size k-1 co-location patterns $P_{k-1}$. In this step, class-level candidate pruning is conducted. Step 6 in the algorithm text/step 505 generates instance-cell-sets $R_k$ of size k candidates $C_k$ generated in the previous step using the instance-cell-sets $R_{k-1}$ of size k-1 co-location patterns $P_{k-1}$.

Step 8 in the algorithm text/step 506 in FIG. 5 performs instance generation, by generating instances of each size k candidate cl in dense instance-cell-set first order, and prunes cl if an upper bound estimation of its pi<min_pi. Via steps 508 and 510, these steps are repeated until the number of size k patterns in $P_k$=1. Then, at step 10 (text of algorithm)/step 512 (FIG. 5), the patterns that generated in each iteration, $\cup$ ($P_2, \ldots, P_k$), are returned.

The following describes some additional details of steps 504-506 of FIG. 5. After the initialization, a first phase generates candidate co-location patterns (step 504) by taking the size k-1 (k≧2) co-location patterns $P_{k-1}$ as input, uses a known (e.g., Apriori-gen) function to generate size k candidate patterns $C_k$ and outputs $C_k$. The function includes a class-level candidate pruning step, as in a traditional candidate generation process.

Step 505 generates instance-cell-sets of candidates by taking the size k candidate patterns $C_k$ and the instance-cell-sets of size k-1 patterns $R_{k-1}$ as input, uses an Apriori-gen like algorithm to generate the instance-cell-sets $R_k$ of size k candidate patterns $C_k$, and outputs $R_k$.

The instance-cell-set generation step comprises a join step. For a size k candidate co-location cl, cl $\in C_k$, suppose that $cl_1$ and $cl_2$ are the two size k-1 co-locations joined to generate cl in the previous step, and R' and R" are the instance-cell-sets of $cl_1$ and $cl_2$ respectively, R',R" $\in R_{k-1}$. Then, instance-cell-set p in R' and q in R" with common first k-2 cells and neighboring last two cells are joined to generate an instance-cell-set r of size-k candidate co-location cl. The first k-1 cells of r are the k-1 cells of p and the last cell is the last cell of q. A sort-merge join is used because the instance-cell-sets $R_k$ of size k co-location patterns can be kept sorted in the next iteration. The algorithm is as follows:

insert into R
select $p.c_1, \ldots, p.c_k, q.c_k$
from R' p, R" q
where $p.c_1$=$q.c_1, \ldots, p.c_{k-1}$=$q.c_{k-1}$, $p.c_k$ and $q.c_k$ are neighboring cells.

Figure 6:
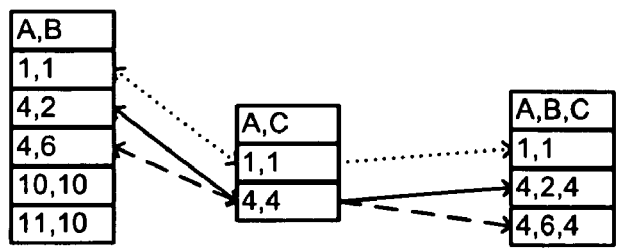
FIG. 6 is a block diagram representing instance-cell-sets corresponding to the data in FIG. 4.

For example, assume that {A,B} and {A,C} in FIG. 4 are prevalent co-location patterns. Then, size 3 candidates {A,B,C} are generated by joining {A,B} and {A,C}. The instance-cell-sets of {A,B} and {A,C} are shown in FIG. 6, in which instance-cell-sets {4, 2} of {A,B} and {4, 4} of {A,C} have a common first cell 4, and the last two cells 2 and 4 are neighboring cells. Thus, {4, 2, 4} is an instance-cell-set of {A,B,C}. Similarly, {1, 1, 1} and {4, 6, 4} are also instance-cell-sets of {A,B,C}.

Step 506 corresponds to dense space first instance generation, which takes five input parameters: a) a size k candidate co-location cl, cl $\in C_k$, b) min_pi, c) the instance-cell-sets $R_{k-1}$ of size k-1 co-location patterns, d) the instances $R_{k-1}$ of size k-1 co-location patterns in instance-cell-sets, and e) the instance-cell-sets $R_k$ of size k candidate co-locations. On example flow determines that if co-location cl turns out to be a prevalent co-location, it generates the instances of cl, and the instances are inserted. The outputs are then updated. If the co-location is not a prevalent co-location, the algorithm prunes without generating the entire instance set, eliminates the instance-cell-sets, and discards any already-generated instances. If the co-location cl turns out to be a co-location pattern, the instances of cl are inserted $RI_k$ and cl is inserted into $P_k$. Thus, the outputs are updated $RI_k$, $R_k$, and $P_k$. Otherwise, the algorithm eliminates the instance-cell-sets of cl in $R_k$.

Figure 7:
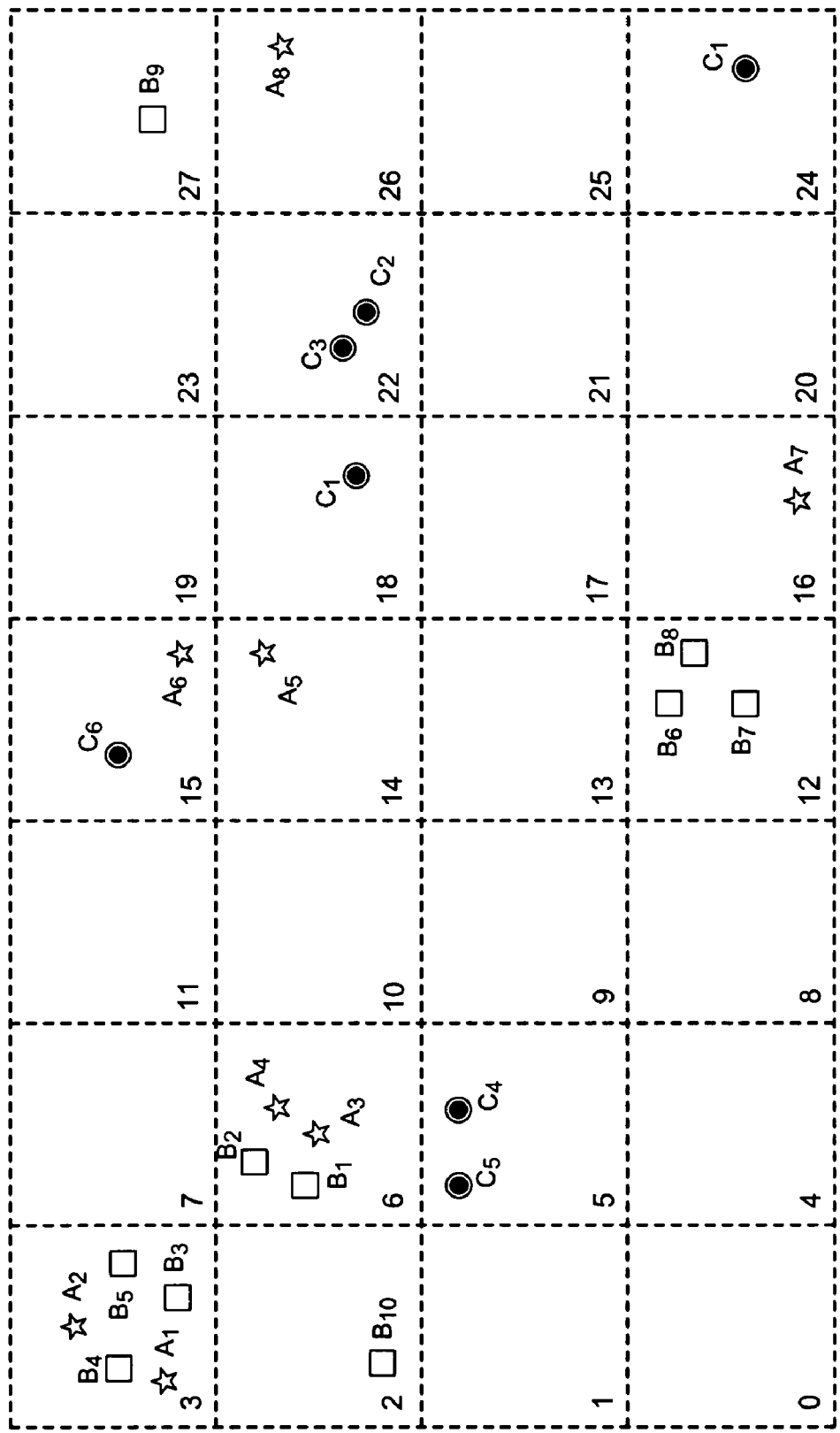
FIG. 7 is a representation of an example spatial instance set in which the data set is partitioned into grids.
Figure 8B:
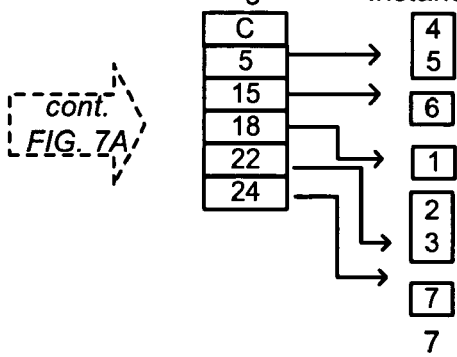

FIGS. 7, 8A and 8B provide a representation of the exemplified algorithm operating on an example spatial data set. FIG. 8A shows an example of how the example algorithm deals with a candidate co-location that turns out to be a co-location pattern (the case of {A,B}). FIG. 8B shows an example of how the algorithm prunes a false co-location candidate before all its instances are generated (the case of {A,C}). In FIGS. 8A and 8B, a dashed arrow from a density table d/a scan status table status to another indicates an update on content of d/status in the dense space first instance generation algorithm. The changes are emphasized with grayed cell background. In these examples, weighted density is used.

The lower and the upper bound of participation ratio (pr) are estimated. The upper bound estimation of pr is used in the algorithm to prune a false candidate before the entire instance set of the candidate is generated. Let $n_i$ indicate the instance number of class $t_i$ in the instances of co-location cl and $n_{ir}$ denote the instance number of $t_i$ in instance-cell-set r of cl, r $\in$ instance-cell-sets R of cl. Then:

$$n_i \leq \sum_{\forall r \in R} n_{ir}. \qquad (6)$$

Instances of a class may be involved in multiple instance-cell-sets of a co-location. For example, in FIG. 4, $B_4$ in instances of co-location {A,B} is involved in instance-cell-sets {10,10} and {11,10}. If instance-cell-sets are grouped together with the same ith cell, the instance-cell-set collection R of cl is partitioned into disjoint subsets. Let $R_{ic}$ denote a sub-group of instance-cell-sets with a common ith cell c. Then, the instances $I_i$ of $t_i$ in co-location instances are the union of instances $I_{ic}$ of $t_i$ in co-location instances of cl in each subgroup of instance-cell-sets $R_{ic}$. As there is no overlap of instances of $t_i$ among different sub-groups, the instance number of $t_i$ in co-location instances of cl is the sum of instance numbers of $t_i$ in each sub-group of instance-cell-sets with a common ith cell, as shown in Equation 7:

$$I_i = \bigcup_{\forall R_{ic}} I_{ic}, |I_i| = \sum_{\forall R_{ic}} |I_{ic}|, \text{ i.e., } n_i = \sum_{\forall R_{ic}} n_{ic} \qquad (7)$$

In a sub-group of instance-cell-sets $R_{ic}$, the instances of $t_i$ in co-location instances of cl in them are the union of instances of $t_i$ in co-location instances of cl in each instance-cell-set in the sub-group as shown in Equation 8:

$$I_{ic} = \bigcup_{\forall r \in R_{ic}} I_{ir} \qquad (8)$$

$$\max_{\forall r \in R_{ic}} |I_{ir}| \leq |I_{ic}| \leq \min\left(\sum_{\forall r \in R_{ic}} |I_{ir}|, N_{ic}\right), \text{ i.e.,} \qquad (9)$$

$$\max_{\forall r \in R_{ic}} n_{ir} \leq n_{ic} \leq \min\left(\sum_{\forall r \in R_{ic}} n_{ir}, N_{ic}\right) \qquad (10)$$

That is, the number of instances $I_{ic}$ of $t_i$ in co-location instances of cl in the sub-group $R_{ic}$ is not greater than the smaller value of $\sum_{\forall r \in R_{ic}} |I_{ir}|$ and the entire instance number of $t_i$ in the cell c. In addition, $I_{ic}$ is not less than the max $|I_{ir}|$. Then, substituting Equation 10 into Equation 7 provides:

$$\sum_{\forall R_{ic}} \max_{\forall r \in R_{ic}} n_{ir} \leq n_i \leq \sum_{\forall R_{ic}} \min\left(\sum_{\forall r \in R_{ic}} n_{ir}, N_{ic}\right). \quad (11)$$

Equation 11 gives the lower and the upper bound of participation ratio of class $t_i$ in instance cl, as shown in Equations 12 and 13:

$$lpr(cl, t_i) = \frac{\sum_{\forall R_{ic}} \max \forall r \in R_{ic} n_{ir}}{N_i} \quad (12)$$

$$upr(cl, t_i) = \frac{\sum_{\forall R_{ic}} \min\left(\sum_{\forall r \in R_{ic}} n_{ir}, N_{ic}\right)}{N_i} \quad (13)$$

Based on Equations 12 and 13, the variable named status is introduced to calculate $lpr(cl,t_i)$ and $upr(cl,t_i)$, i.e., the $lpr_i$ and $upr_i$ variables. The status variable has three fields: 1) status $[t_i][c]$.sum corresponds to the sum factor $\Sigma_{\forall r \in Ric} n_{ir}$ for calculating the upper bound estimation $upr_i$ in Equation 13, 2) status$[t_i][c]$.max corresponds to the max factor max$_{\forall r \in Ric}$ for calculating the lower bound estimation $lpr_i$ in Equation 12, 3) status$[t_i][c]$.occ refers to the number of instance-cell-sets with a common ith dimensional cell c in the instance-cell-sets of co-location cl. For example, in FIGS. 8A and 8B, three instance-cell-sets {3,2}, {3,3}, and {3,6} of {A,B} have the common first cell 3, so status[A][3].occ=3. Similarly, two instance-cell-sets {3,2} and {6,2} of {A,B} have the common second cell 2, so status[B][2].occ=2.

In addition to lower and upper bound estimation of pr, another concept used in the dense space first instance generation step is dynamic density of an instance-cell-set. As described above, the density of an instance-cell-set, whether naïve density or weighted density, indicates its contribution to the participation index, and is related to the number of instances of classes in a candidate, as shown in Equation 5.

In addition to instance numbers of classes in cl, the contribution of an instance-cell-set to participation index is also related to co-located instances in previously scanned instance-cell-sets. For example, in FIG. 7, instance-cell-set {3,3} and {6,3} of co-location {A,B} have the common second cell 3. The initial weighted density of {3,3} and {6,3} are both 2/8+3/10. If first generating instances in instance-cell-set {3,3} (the instances are as shown in FIG. 7, then, the three instances B3, B4, and B5 of B contributes to pr of B. At this point, instance-cell-set {6,3} cannot contribute to pr of B even if B3, B4, and B5 also appear in the instances of {A,B} in instance-cell-set {6,3}. The reason is that the contribution of B3, B4, and B5 is already counted in when co-location instances in {3,3} are generated. In this case, the only contribution of {6,3} is the number of instances of A in the instances of {A,B} in {6,3}. Therefore, the only contribution of {6,3} is the number of instances of A in the instances of {A,B} in {6,3}. Considering this situation, dynamic density is used to measure the real contribution of instance-cell-sets to pi considering both the initial instance numbers of classes in candidate cl in its instance-cell-sets and the counted instance number of classes in already scanned instance-cell-sets.

Instances of classes in instance-cell-set r that may still contribute to participation index are the instances that have not appeared in already generated instances in instance-cell-sets. The number of the uncounted instances of a class $t_i$ in instance-cell-set r is at most the initial instance number of $t_i$ in r minus the max instance number of $t_i$ in already generated instances in instance-cell-sets with a common ith cell, i.e., $n_{ir}$-status$[t_i][c]$.max, where c is the ith cell of r. Thus, naïve dynamic density ndd and weighted dynamic density wdd of instance-cell-set r={$c_1, \ldots c_k$} of candidate cl={$t_1, \ldots t_k$} are calculated as shown in Equations 14 and 15.

$$ndd(r) = nd(r) - \sum_{i=1}^{k} \text{status}[t_i][c_i] \cdot \max \quad (14)$$

$$wdd(r) = wd(r) - \sum_{i=1}^{k} \frac{\text{status}[t_i][c_i] \cdot \max}{N_i} \quad (15)$$

In the example of in FIG. 7, the dynamic density of instance-cell-set {6,3} (rid is 4) after instance-cell-set {3,3} (rid is 1) is scanned is the initial density 2/8+3/10 minus the max number of counted instance of classes, i.e., 3/10. That is 2/8.

Note that both d and status are local variables used for recording some intermediate results of a co-location candidate. The results are discarded after examination on a candidate ends and the space is released. Therefore, efficient data structures with more memory cost may be used, such as hash and heap, to make searching and updating on d and status efficient. In FIGS. 8A and 8B, d and status tables point to Φ, which indicates they are released after deciding whether a candidate is prevalent or not.

The dense space first instance generation algorithm (step 506 of FIG. 5) includes two pruning steps. A first is instance-cell-set level candidate pruning, which uses the initial upper bound estimation of pi before generating co-location instances (steps 1 and 2 in the dense space first instance generation algorithm, below). A second is instance level candidate pruning, which utilizes the dynamic lower and upper bound estimations of pi during the co-location instance generation process (the remaining steps in the dense space first instance generation algorithm).

Dense space first instance generation algorithm:

```
Input:
   cl = {t₁,...,t_k}, min_pi, P_k, R_{k-1}, R_k, RI_{k-1}, RI_k
Output:
   P_k, RI_k
Variables
   lpr, upr, lpi, upi, d, status
Method
1: initialize lpr, upr, lpi, upi, status;
2: if (upi ≥ min_pi) then
3:    d=calculate initial densities(R,G);
4:    while(more instance-cell-sets in d and lpi < min_pi
      and upi ≥ min_pi) do
5:       d[r]=update density(status);
6:       if (d[r] is not reduced) then
7:          RI=generate instances in instance-cell-
set(r,RI',RI'');
8:          update lpr, upr, lpi, upi, status;
9:       if (upi ≥ min_pi) then
10:         if (more instance-cell-sets in d and lpi ≥ min_pi)
         then
11:            RI=generate instances in instance-cell-
set(r,RI',RI'');
12:         calculate pi of cl
```

-continued

| 13: | if (pi ≧ min_pi) then |
| 14: | insert cl into $P_k$; |

Let R denote instance-cell-sets of size k candidate co-location cl, R' and R" denote instance-cell-sets of two size k-1 co-locations $cl_1$ and $cl_2$ that are joined to generate $c_1$. R is in $R_k$, and R' and R" are in $R_{k-1}$. Let RI denote instances in instance-cell-sets of candidate cl, RI' and RI" denote instances in instance-cell-sets of $cl_1$ and $cl_2$. RI is in $RI_k$, and R' and R" are in $RI_{k-1}$.

Figure 8B:
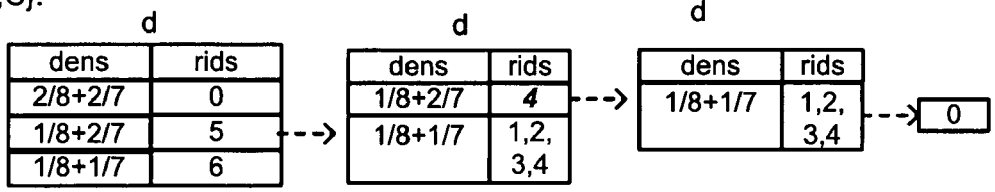
Figure 8B:
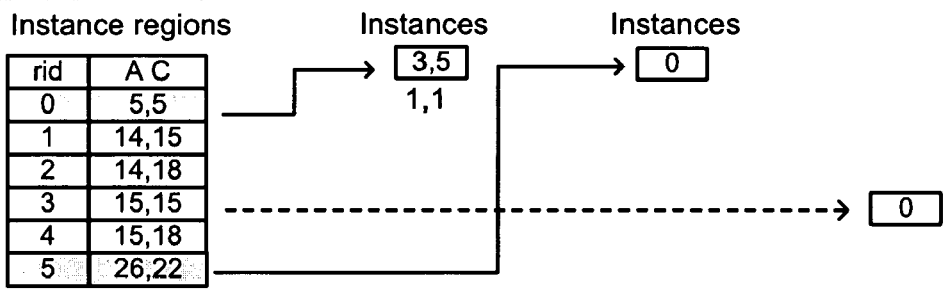

A first step initializes lpr, upr, lpi, upi, and status (step 1). The variable status[$t_i$][$c_i$].occ is obtained by scanning the instance-cell-sets R of candidate cl, and all max and sum attribute values are zero. $\forall_i$,$lpr_i$=0, and initial $upr_i$ can be calculated using Equation 13. Correspondingly, upi=$\min_{ti}$ ($upr_i$), lpi=0. For example, FIG. 8 shows the initial values of the variables of candidate {A,B}.

Using the obtained initial $upr_i$, the algorithm performs an instance-cell-set level candidate pruning step before generating co-location instances (step 2). If upi<min_pi, cl is pruned. For example, in FIG. 7, the instance-cell-sets of {B,C} are {2,5}, {6,5}, and {27,22}. Then, the instance number of B in the three instance-cell-sets is 4, and that of C is also 4. As upr of B is 4/10, which is smaller than the min_pi=0.5, {B,C} is pruned immediately.

If the upi≧min_pi, the algorithm continues to do instance level candidate pruning. It first sorts instance-cell-sets by descendent initial density order (step 3). For example, in FIGS. 8A and 8B, the most dense instance-cell-sets of {A,B} are {3,3} and {6,3}, followed by instance-cell-sets {3,6} and {6,6}, and so forth. Then, in the order of densities of instance-cell-sets in d, the instances in each instance-cell-set are generated. The instance-cell-set r with the greatest density in d is first selected, and its density d[r] updated considering the current scan status of r according to Equations 14 or 15 (step 5). If d[r] is reduced, it means that the instances in r that have already occurred in previously scanned instance-cell-sets.

Then, the algorithm updates the density of r in d and keeps d sorted. Otherwise, it generates instances in r using the generate instances in instance-cell-set function (step 7, an Apriori-gen like function). Let ri denote the instance set of cl in r. Let $ri_1$ and $ri_2$ denote the instance sets of the two instance-cell-sets $r_1$ and $r_2$ that are joined to generate r. The function is as follows:
insert into ri
select $p.i_1, \ldots, p.i_k, q.i_k$
from $ri_1$ p, $ri_2$ q
where $p.i_1=q.i_1, \ldots, p.i_{k-1}=q.i_{k-1}, R(p.i_k; q.i_k)$ After generating instances in an instance-cell-set, the algorithm updates the scanning status, correspondingly updates the current lower and upper bounds of pr for all classes in cl using Equations 12 and 13, and obtains the new lpi and upi (step 8). For example, for {A,C}, after the first instance-cell-set {6,5} (rid=0) is scanned, status[A][6].occ and status[C][5].occ are both reduced by one. In addition, the following update is done: status[A][6].max and status[C][5].max are changed from 0 to 1, and status[A][6].sum and status[C][5].sum are changed from 0 to 1. As status[A][6].max and is increased, $lpr_A$ is added by the increment on status[A][6].max. Thus, $lpr_A$=1/8; similarly, $lpr_C$=1/7. In addition, because status[A][6].occ=0 and status[A][6].sum=1<2, $upr_A$ is decreased by 1/8; similarly, $upr_C$=5/7.

After the updated $lpr_i$ and $upr_i$ are obtained, the algorithm checks whether upi=$\max_{i=1}^{K} upr_i$ is less than min_pi and whether lpi=$\max_{i=1}^{K} lpr_i$ is not less than min_pi. If upi≧min_pi, lpi<min_pi, and there are still some un-scanned instance-cell-sets (step 4), the above steps from step 5 to step 9 in the algorithm are repeated. Otherwise, if upi<min_pi, the co-location candidate is already un-prevalent. Instance generation in the remaining instance-cell-sets is then stopped. The candidate is directly pruned and the algorithm terminates. For example, in FIG. 8B, upi of {A,C} is less than 0.5 after the first two instance-cell-sets are scanned, whereby {A,C} is pruned immediately. Otherwise, if lpi≧min_pi and un-scanned instance-cell-sets exist, it indicates that the co-location candidate is already prevalent with the partially generated instances. If so, instances are sequentially generated in the remaining instance-cell-sets in d, without further updating status, upi, and lpi (steps 10 and 11). For example, in FIGS. 8A and 8B, lpi of {A,B}≧0.5 after the first two instance-cell-sets are scanned. So we sequentially generate instances in remaining instance-cell-sets without updating d, status and bound variables.

Also calculated is the pi of the pruned candidate; if pi≧min_pi, the candidate is identified to be a prevalent pattern and inserted into $P_k$ (steps 12 and 14).

As can be seen, the algorithm reduces the number of joins through avoiding generating the complete instance set of un-prevalent candidates. For example, in FIGS. 8A and 8B, only two in five instance-cell-sets are scanned when the candidate {A,C} is found to be un-prevalent and pruned. In actual association rule mining tasks, the number of false candidates (non-prevalent co-locations) is typically much more than the number of true patterns. Therefore, the algorithm can reduce a larger number of joins used to generate instances of false candidates. The algorithm also reduces joins for prevalent co-location patterns if the task is to mine patterns with fixed size, say size K patterns, and pi is not needed. In this situation, if a size K co-location candidate is found prevalent when its instance-cell-sets are partially scanned, the algorithm also stops scanning the remaining instance-cell-sets as it does for false candidates. In this manner, the number of joins for prevalent patterns is also reduced. For example, in FIGS. 8A and 8B, only two in seven instance-cell-sets are scanned when {A,B} is found to be prevalent.

Exemplary Operating Environment

Figure 9:
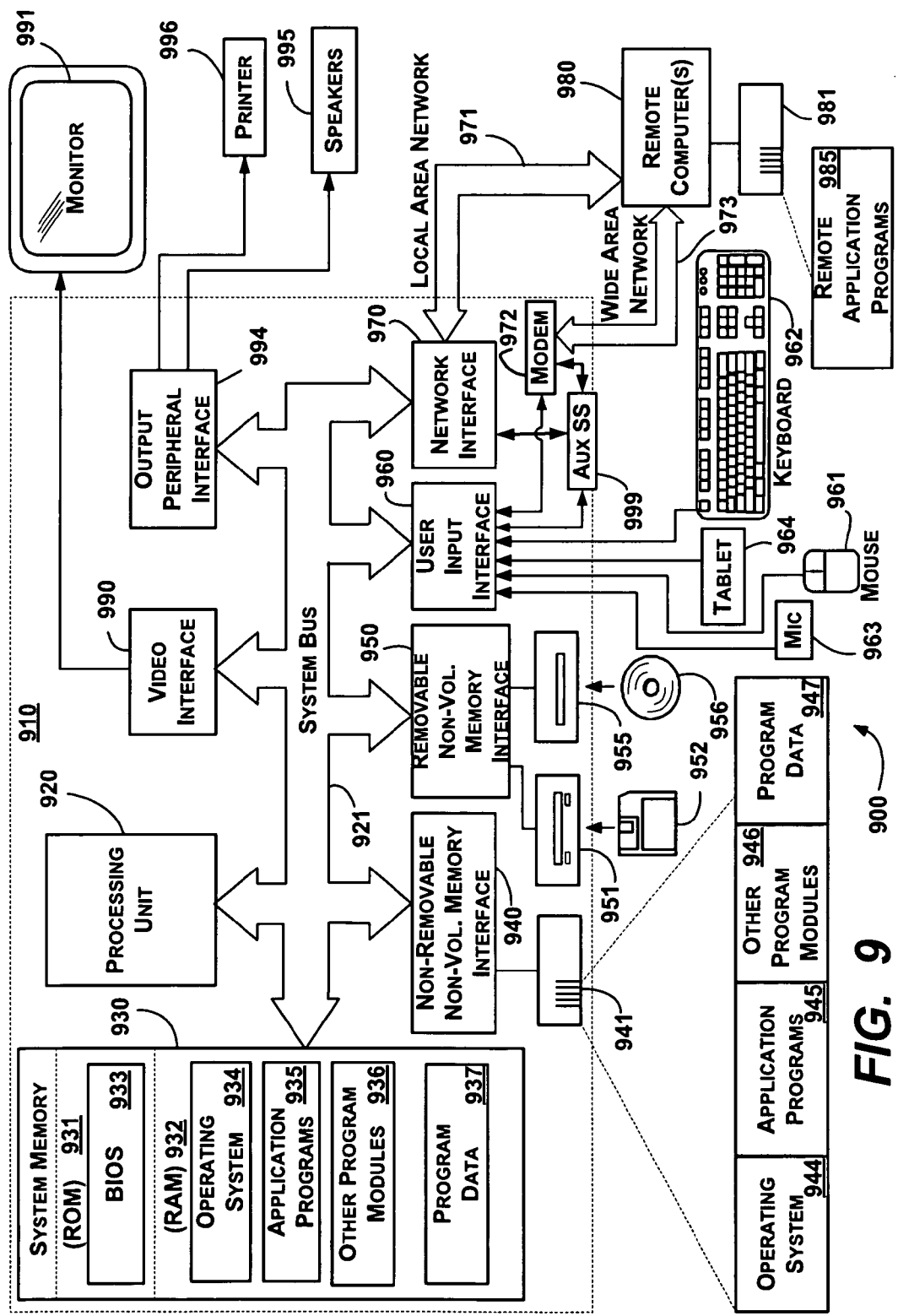
FIG. 9 shows an illustrative example of a computing environment into which various aspects of the present invention may be incorporated.

FIG. 9 illustrates an example of a suitable computing system environment 900 on which the examples of FIGS. 1-8B may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 9, an exemplary system for implementing various aspects of the invention may include a general purpose computing device in the form of a computer 910. Components of the computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer-readable media. Computer-readable media can be any available media that can be accessed by the computer 910 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 910. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936 and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media, described above and illustrated in FIG. 9, provide storage of computer-readable instructions, data structures, program modules and other data for the computer 910. In FIG. 9, for example, hard disk drive 941 is illustrated as storing operating system 944, application programs 945, other program modules 946 and program data 947. Note that these components can either be the same as or different from operating system 934, application programs 935, other program modules 936, and program data 937. Operating system 944, application programs 945, other program modules 946, and program data 947 are given different numbers herein to illustrate that, at a minimum, they are different copies. A user may enter commands and information into the computer 910 through input devices such as a tablet, or electronic digitizer, 964, a microphone 963, a keyboard 962 and pointing device 961, commonly referred to as mouse, trackball or touch pad. Other input devices not shown in FIG. 9 may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. The monitor 991 may also be integrated with a touch-screen panel or the like. Note that the monitor and/or touch screen panel can be physically coupled to a housing in which the computing device 910 is incorporated, such as in a tablet-type personal computer. In addition, computers such as the computing device 910 may also include other peripheral output devices such as speakers 995 and printer 996, which may be connected through an output peripheral interface 994 or the like.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include one or more local area networks (LAN) 971 and one or more wide area networks (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960 or other appropriate mechanism. A wireless networking component 974 such as comprising an interface and antenna may be coupled through a suitable device such as an access point or peer computer to a WAN or LAN. In a networked environment, program modules depicted relative to the computer 910, or portions thereof, may be stored in the remote memory storage device. By way of example, and not limitation, FIG. 9 illustrates remote application programs 985 as residing on memory device 981. It may be appreciated that the network connections shown are exemplary and other means of establishing a communications link between the computers may be used.

An auxiliary subsystem 999 (e.g., for auxiliary display of content) may be connected via the user interface 960 to allow data such as program content, system status and event notifications to be provided to the user, even if the main portions of the computer system are in a low power state. The auxiliary subsystem 999 may be connected to the modem 972 and/or network interface 970 to allow communication between these systems while the main processing unit 920 is in a low state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method of mining co-location patterns, the method comprising:
    partitioning, by a computer, a set of spatial data into a grid of cells, wherein the spatial data comprises a plurality of instances of a plurality of classes, and wherein the grid represents a non-uniform distribution of the instances in geographic space, and wherein any cell of the grid is a neighboring cell to itself and to any other cell of the grid given a common side or a common vertex; and
    processing the cells of the grid in a dense space first order where a cell that comprises more of the spatial data is processed before a cell that comprises less of the spatial data, wherein the processing comprises:
        initializing, by the computer, k≧2, where k is a variable, and
        step 1: generating, by the computer and in response to the partitioning and the initializing, size k candidate patterns $C_k$ based on size k-1 patterns $P_{k-1}$.

2. The method of claim 1, the processing further comprising step 2: generating, in response to step 1, instance-cell-sets $R_k$ of the size k candidate patterns $C_k$ based on the size k candidate patterns $C_k$ and instance-cell-sets of size k-1 patterns $R_{k-1}$.

3. The method of claim 2, the processing further comprising step 3: generating, in response to step 2, instances of each size k candidate cl of the size k candidate patterns $C_k$ in the dense space first order.

4. The method of claim 3, the processing further comprising:
    incrementing, in response to step 3, k by one, and
    repeating, in response to the incrementing, step 1 and then step 2 and then step 3 until a number of size k patterns in $P_k$ is one, where $P_k$ is a set of size k co-location patterns, at which point the processing stops.

5. The method of claim 1, the processing further comprising pruning a false candidate pattern of the size k candidate patterns $C_k$.

6. The method of claim 1 wherein each of the cells are of equal size.

7. The method of claim 1 wherein any two of the instances that are neighbors are located in neighboring cells.

8. At least one computer storage medium storing computer-executable instructions that, when executed by a computer, cause the computer to perform a method of mining co-location patterns, the method comprising:
    partitioning a set of spatial data into a grid of cells, wherein the spatial data comprises and a plurality of instances of a plurality of classes, and wherein the grid represents a non-uniform distribution of the instances in geographic space, and wherein any cell of the grid is a neighboring cell to itself and to any other cell of the grid given a common side or a common vertex; and
    processing the cells of the grid in a dense space first order where a cell that comprises more of the spatial data is processed before a cell that comprises less of the spatial data, wherein the processing comprises:
        initializing k≧2, where k is a variable, and
        step 1: generating, in response to the partitioning and the initializing, size k candidate patterns $C_k$ based on size k-1 patterns $P_{k-1}$.

9. The at least one computer storage medium of claim 8, the processing further comprising step 2: generating, in response to step 1, instance-cell-sets $R_k$ of the size k candidate patterns $C_k$ based on the size k candidate patterns $C_k$ and instance-cell-sets of size k-1 patterns $R_{k-1}$.

10. The at least one computer storage medium of claim 9, the processing further comprising step 3: generating, in response to step 2, instances of each size k candidate cl of the size k candidate patterns $C_k$ in the dense space first order.

11. The at least one computer storage medium of claim 10, the processing further comprising:
    incrementing, in response to step 3, k by one, and
    repeating, in response to the incrementing, step 1 and then step 2 and then step 3 until a number of size k patterns in $P_k$ is one, where $P_k$ is a set of size k co-location patterns, at which point the processing stops.

12. The at least one computer storage medium of claim 8, the processing further comprising pruning a false candidate pattern of the size k candidate patterns $C_k$.

13. The at least one computer storage medium of claim 8 wherein each of the cells are of equal size.

14. The at least one computer storage medium of claim 8 wherein any two of the instances are that neighbors are located in neighboring cells.

15. A system comprising:
    a computer;
    a co-location pattern processing mechanism implemented by the computer and configured for partitioning a set of spatial data into a grid of cells, wherein the spatial data comprises and a plurality of instances of a plurality of classes, and wherein the grid represents a non-uniform distribution of the instances in geographic space, and wherein any cell of the grid is a neighboring cell to itself and to any other cell of the grid given a common side or a common vertex; and the co-location pattern processing mechanism further configured for processing the cells of the grid in a dense space first order where a cell that comprises more of the spatial data is processed before a cell that comprises less of the spatial data, wherein the processing comprises:

initializing $k \geq 2$, where k is a variable, and step 1: generating, in response to the partitioning and the initializing, size k candidate patterns $C_k$ based on size k-1 patterns $P_{k-1}$.

16. The system of claim 15, the processing further comprising performing step 2: generating, in response to step 1, instance-cell-sets $R_k$ of the size k candidate patterns $C_k$ based on the size k candidate patterns $C_k$ and instance-cell-sets of size k-1 patterns $R_{k-1}$.

17. The system of claim 16, the processing further comprising performing step 3: generating, in response to step 2, instances of each size k candidate cl of the size k candidate patterns $C_k$ in the dense space first order.

18. The system of claim 17, the processing further comprising:

incrementing, in response to step 3, k by one and repeating, in response to the incrementing, step 1 and then step 2 and then step 3 until a number of size k patterns in $P_k$ is one, where $P_k$ is a set of size k co-location patterns, at which point the processing stops.

19. The system of claim 15, the processing further comprising for pruning a false candidate pattern of the size k candidate patterns $C_k$.

20. The system of claim 15 wherein any two of the instances that are neighbors are located in neighboring cells.

* * * * *